United States Patent [19]
Puttick

[11] 3,774,391
[45] Nov. 27, 1973

[54] INTERNAL COMBUSTION ENGINES

[75] Inventor: Jeffrey Roy Puttick, Upper Beeding, Sussex, England

[73] Assignee: National Research Development Corporation, London, England

[22] Filed: Mar. 31, 1971

[21] Appl. No.: 129,700

[30] Foreign Application Priority Data
- Apr. 1, 1970 Great Britain.................15517/70
- Apr. 1, 1970 Great Britain.................15520/70
- Apr. 1, 1970 Great Britain.................15522/70

[52] U.S. Cl.............. 60/14, 60/17, 123/119 A, 123/119 E
[51] Int. Cl............................. F02b 69/00
[58] Field of Search............ 60/6, 17, 14; 123/26, 119 E, 119 A

[56] References Cited
UNITED STATES PATENTS

| | | | |
|---|---|---|---|
| 1,133,488 | 3/1915 | McMurtry | 60/17 |
| 2,645,216 | 7/1953 | Cambell | 123/119 A |
| 2,681,645 | 6/1954 | Hoke, Jr. | 123/119 A |
| 2,720,856 | 10/1955 | Hoke, Jr. | 123/119 A X |
| 3,507,260 | 4/1970 | Walker | 123/119 A |
| 3,618,576 | 11/1971 | Dixon | 60/39.52 |
| 3,621,825 | 11/1971 | Ojala | 123/119 A |

Primary Examiner—Edgar W. Geoghegan
Assistant Examiner—Allen M. Ostrager
Attorney—Cushman, Darby & Cushman

[57] ABSTRACT

A compression-ignition internal combustion engine power plant is provided with means for submerged operating in the recycle mode in which a proportion of the exhaust gas discharged from the engine is mixed with pure oxygen gas and is supplied to the engine intake for aspiration and combustion with liquid hydrocarbon fuel injected into the combustion chamber, as an alternative to operation with normal aspiration of atmospheric air. Five control valves or valve groups are provided for controlling the oxygen gas supply, the atmospheric air intake, the exhaust outlet to atmosphere, the exhaust gas recycle conduit and the supply of compressed air for starting, and a two-stage electropneumatic control system of pneumatic valves is provided for operating the control valves in accordance with the requirements of the different modes of operation of the engine and for changing between modes. The engine is controlled to run in the recycle mode at a constant maximum speed under varying loads by control of the oxygen gas supply in dependence on the governed fuel input, or vice versa. The gas pressure in the engine intake is controlled to a constant absolute value by being sensed by an aneroid capsule which provides a feedback signal for regulating the speed of the exhaust gas compressor of the engine.

8 Claims, 7 Drawing Figures

FIG. I.

Patented Nov. 27, 1973

INVENTOR
JEFFREY R. PUTTICK
BY
Cushman, Darby & Cushman
ATTORNEYS

INTERNAL COMBUSTION ENGINES

This invention relates to internal combustion engines provided with recycling facilities, and particularly but not exclusively to fuel-injection compression-ignition engines, for example diesel engines. The invention is concerned with enabling such engines to operate not only under ordinary atmospheric conditions but also in a recycling mode in an atmosphere where a sufficient supply of atmospheric air is not present, for example to provide a power supply for submerged running of a submersible vessel, or a separate undersea power source in a pressure-tight capsule. In the recycle system the engine is operated on a normal hydrocarbon fuel, but the required oxygen is supplied in pure gaseous form from a separate supply and is diluted at the engine intake with cooled recirculated exhaust gas from the engine to prevent dangerous concentrations of pure oxygen from reaching the combustion chamber(s) of the engine. The oxygen supply may be stored in a liquid or gaseous form under pressure, or it may be generated by the decomposition of hydrogen peroxide or other suitable chemicals.

The invention is applicable to the recycling of I.C. engines not only in submersible craft, e.g., submarines, but also in static or mobile underwater installations of many kinds, for example caissons or diving bells, or underwater power plants for providing power to operate divers' tools or other devices, for example through compressed air lines.

In an I.C. engine power plant provided with a recycling facility for underwater use, provision is normally made for the aspiration of atmospheric air when running on the surface of the water, and also for drawing pure oxygen gas from a supply and mixing this with recycled exhaust gas for running in the recycling mode when submerged. In addition, when the engine is running submerged at a substantial depth, means has to be provided for compressing the exhaust gas in order that the surplus exhaust gas not required for recycling can be discharged against the high ambient water pressure. For starting when submerged, compressed air is aspirated initially, since no recycled exhaust gas is then available for diluting the pure oxygen.

In order to provide for the basic modes of operation, namely starting and running on the surface using aspirated atmospheric air as the oxygen supply for combustion, starting when submerged using compressed air as the combustion gas, and running when submerged using pure oxygen diluted with recycled exhaust gas as the aspirated gas for combustion, five basic operating valves will normally be provided, namely an inlet valve for atmospheric air, an exhaust isolator valve which separates the exhaust system from the inlet system when not recycled, a compressed oxygen gas supply valve, a compressed air supply valve and a bypass valve for the exhaust compressor. Certain of these basic valves may be provided as groups of two or more individual valve units.

For experimental purposes under laboratory or test tank conditions, these five operating valves can be controlled manually in accordance with the required mode of operation of the engine, but under actual service conditions manual control of these valves would normally be unacceptable since slow or faulty operation of the valves could be extremely dangerous.

According to the present invention, in an I.C. engine power plant provided with facilities for recycle operation in a submerged hull or capsule, as well as for conventional aspiration at surface level, there is provided a control system of logic devices responsive to demand signals for different modes of operation of the engine, e.g., the conventional aspiration mode and the recycle operation mode, the control system being arranged to automatically operate control valves in response to the demand signals, which control valves control the aspiration and exhaust of the engine in accordance with predetermined programmes corresponding to the requirements of the demanded modes of operation and of changing over between such modes.

The control system may be basically a pneumatic one, making use of pneumatic valves as the logic devices. This is convenient in a submarine or in a static chamber or capsule where a supply of compressed air is normally available. Certain of the pneumatic valves may be electrically-operated in response to electrical demand signals from a control panel.

For example, for programming the operation of the five basic aspiration and exhaust control valves or valve groups of the engine referred to above, in order to provide for surface running with conventional aspiration, recycle operation when submerged, submerged starting on compressed air, and the change-over requirements between these modes, the control system may comprise a first stage of at least three solenoid-operated multi-way pneumatic valves, one responsive to a demand signal to run, another responsive to a demand signal for either recycle or conventional aspiration, and a third responsive to a demand signal for a submerged start with compressed air aspiration, and a second stage of multi-way pneumatic valves operated by pneumatic pilot signals from the first stage valves, the second-stage valves having outputs selectively connected to the control valves to actuate the latter.

There may be two four-way second-stage valves. One of these may serve to control an atmospheric air intake control valve and an exhaust gas compressor bypass control valve, and also to control the supply of pressure air to the second second-stage valve. The latter valve may serve to control on the one hand the operation of a compressed air supply control valve for submerged starting, and on the other hand a pure oxygen gas supply control valve or valve group for recycle operation.

The control system may also incorporate pneumatic timing means for determining the period of submerged starting on compressed air aspiration, the timing means being arranged to cause an automatic change-over to recycle operation after a predetermined period.

A further feature of the invention concerns the control of the engine under recycle operating conditions, and more specifically the metering of the proportion of gaseous oxygen aspirated by the engine to hydrocargon fuel injected into the engine for combustion therewith under different running conditions. The quantity of oxygen required by the engine under any running conditions is dependent on the fuel input, the relationship between these two quantities being obtained experimentally. In efficient operation of the engine, and especially under remote control with rapid changes of load, it is essential that the oxygen proportioning should be accomplished automatically.

According to this further feature of the invention the engine, which in this case is of the liquid-fuel-injection type, for example a compression-ignition engine, is provided with governor means for regulating the fuel input in such a way as to maintain constant full engine speed under varying loads, means for supplying oxygen or oxygen-containing gas via a variable-orifice pressure-reducing valve and via a critical-flow metering orifice under "choked" flow conditions for aspiration at the engine intake, and means for controlling the upstream gas pressure at the metering orifice by adjusting the reducing valve in dependence on the fuel input to the engine.

The latter means may comprise an interconnection between the rack of a fuel injection pump of the in-line type and the reducing valve.

Alternatively, the governor may be coupled to the reducing valve for adjusting the gas pressure upstream of the metering orifice so as to regulate the oxygen input to the engine in such a way as to maintain constant full engine speed under varying loads, and means may be provided for controlling the fuel input to the engine in dependence on the said upstream gas pressure.

Thus in a method of operating the said liquid-fuel-injection I.C. engine under recycle conditions to produce a varying power output, the engine is operated at a governed constant maximum rated speed whenever a power output is required, the engine speed being regulated by control of the fuel or oxygen input in accordance with load, the oxygen gas for combustion being metered through a critical flow orifice under "choked" flow conditions at a pressure upstream of the orifice which is controlled automatically in dependence on the fuel input, or is used to set the fuel input.

It is known that a flow of gas can be metered by means of such an orifice under "choked" flow conditions, when the mass flow of the gas is a function only of the upstream gas pressure and temperature at the orifice. Provided that the gas is available at a suitably high pressure, it is therefore possible to meter the gas accurately over a range of flows by varying the upstream pressure at constant temperature.

If the engine were operated at variable speed, however, the range of oxygen flow required for efficient operation at all speeds and loadings from idling speed to full load and speed would be very large, and if metering were to be performed by a simple fixed orifice this would require such a high gas pressure upstream of the orifice that the available storage capacity of the storage bottles would be insufficient.

In the present invention this difficulty may be avoided by operation of the engine at a constant full speed under all load conditions, which results in the range of oxygen flow from full load to no load being greatly reduced.

Operating the engine at fixed speed has the further advantage that if an in-line fuel injection pump is employed with a diesel engine, the rack position of the pump gives an accurate indication of the fuel mass flow and may be used for setting the upstream pressure of the gas metering orifice. Alternatively, of course, the upstream pressure may be utilised to set the rack position.

A further feature of the present invention is concerned with the regulation of the gas pressure at the engine gas intake during recycling operation. For satisfactory operation in the recycle mode, it is necessary to maintain the gas pressure at the engine inlet manifold at a constant absolute value, say 20 p.s.i. absolute, despite variations in the ambient pressure in the hull or capsule in which the engine is operating.

According to this further feature of the invention this is achieved by the provision of means for controlling the volumetric output of the exhaust gas compressor (by which the pressure of the recycled exhaust gas is determined) in response to control signals from an aneroid capsule exposed to the gas pressure in the engine intake, any variation in the engine intake gas pressure from the required absolute value being sensed by the aneroid capsule which will deliver a feedback signal to the output control of the compressor drive to alter the compressor output in the sense to restore the gas pressure at the engine intake of the required absolute value.

The invention may be carried into practice in various ways, but one specific embodiment will now be described by way of example only with reference to the accompanying drawings, in which.

Figure 1:
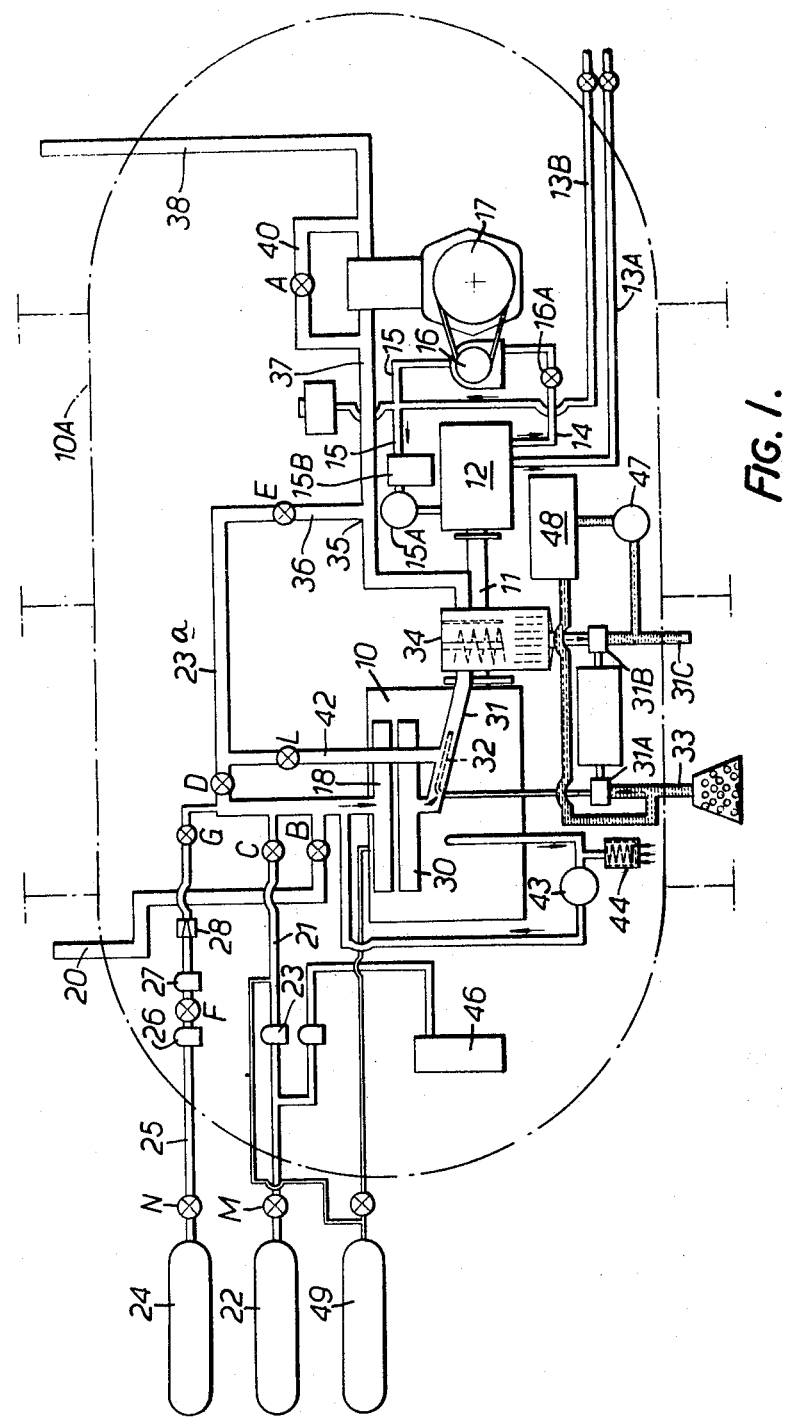
FIG. 1 is a block diagram of a submarine power plant including a recycling diesel engine.

The submarine power plant shown in FIG. 1 comprises a diesel engine 10, mounted in the hull of a submarine or in a pressure-tight capsule (shown diagrammatically at 10A) for surface and submerged operation, the engine shaft 11 being coupled to a hydraulic pump 12 to drive the pump. Driven by the pump 12 via hydraulic pipes 14 and 15 is a hydraulic motor 16, the pump 12 and motor 16 constituting a hydrostatic drive for an exhaust gas compressor 17. A feed pump 15A and filter 15B are connected in return line 15. Hydraulic power take off lines 13A and 13B are also connected to the pump 12.

An inlet manifold 18 connected to the aspirating intake of the engine 10 can supply to the intake either atmospheric air from an air intake 20 under the control of an atmospheric air intake valve B or compressed air from a compressed air intake 21 connected to a compressed air bottle 22 via a manual valve M, a reducing valve 23 and a control valve C, or a mixture of recycled exhaust gas supplied through a recycling conduit 23a and pure oxygen supplied from a compressed oxygen bottle 24. The oxygen bottle 24 is connected via a supply pipe 25 to the conduit 23a. Connected in the oxygen supply pipe 25 is a manual control valve N; a reducing valve 26 by which the oxygen pressure is reduced to about 150 lbs. per square inch; and a further reducing valve 27 which together with a throttling orifice 28 controls the flow of oxygen; and a pair of seriesconnected control valves F and G located one on either side of the valve 27 and orifice 28.

The exhaust manifold 30 of the engine 10 is connected to an exhaust duct 31 in which the exhaust gas is cooled by seawater sprayed into the duct 31 by means of a nozzle 32 connected to an intake pipe 33. A pump 31A is connected in the intake pipe 33 to pump the seawater to the nozzle 32, if necessary, and a discharge pump 31B is provided in a liquid discharge duct 31C for pumping the used seawater out of the manifold. The exhaust duct 31 leads via a water separator 34 to a junction 35 one branch 36 of which leads into the recycle conduit 23a via an isolator valve E, and the other branch 37 of which leads to the intake of the exhaust compressor 17 which compresses the exhaust gas to above the external water pressure. The delivery outlet of the exhaust compressor 17 leads to the exhaust discharge pipe 38 which discharges outside the hull or capsule into atmosphere or into the surrounding water via a conventional sea cock. A bypass connection 40 is provided which bypasses the compressor 17 for connecting the exhaust duct branch 37 direct to the delivery pipe 38 via a bypass control valve A.

A recycle bypass passage 42 extends between a point in the exhaust duct 31 upstream of the cooling nozzle 32 and the recycle conduit 23a, for the purpose of bleeding a proportion of uncooled exhaust gas into the conduit 23a to raise the temperature of the cooled recycled gas in the conduit 23a. To regulate the temperature of the gas mixture aspirated into the engine intake manifold to this required value, a throttle valve L is connected in the bypass passage 42. A second recycle isolator valve D is incorporated in the conduit 23a beyond its connection with the bypass passage 42.

A small compressor 43 with a relief valve 44 pumps out the crank-case slowly and returns this to the intake manifold 18, thereby keeping the crankcase gas pressure below the pressure in the hull or capsule 10A. A pneumatic control panel 46 is provided for controlling the valve logic system to be described. A pump 47 and intercooler system 48 is provided for water-cooling the engine coolant, the hydraulic fluid and the exhaust compressor coolant. The hydrocarbon fuel for the engine is stored in a pressure bottle 49.

Figure 2:
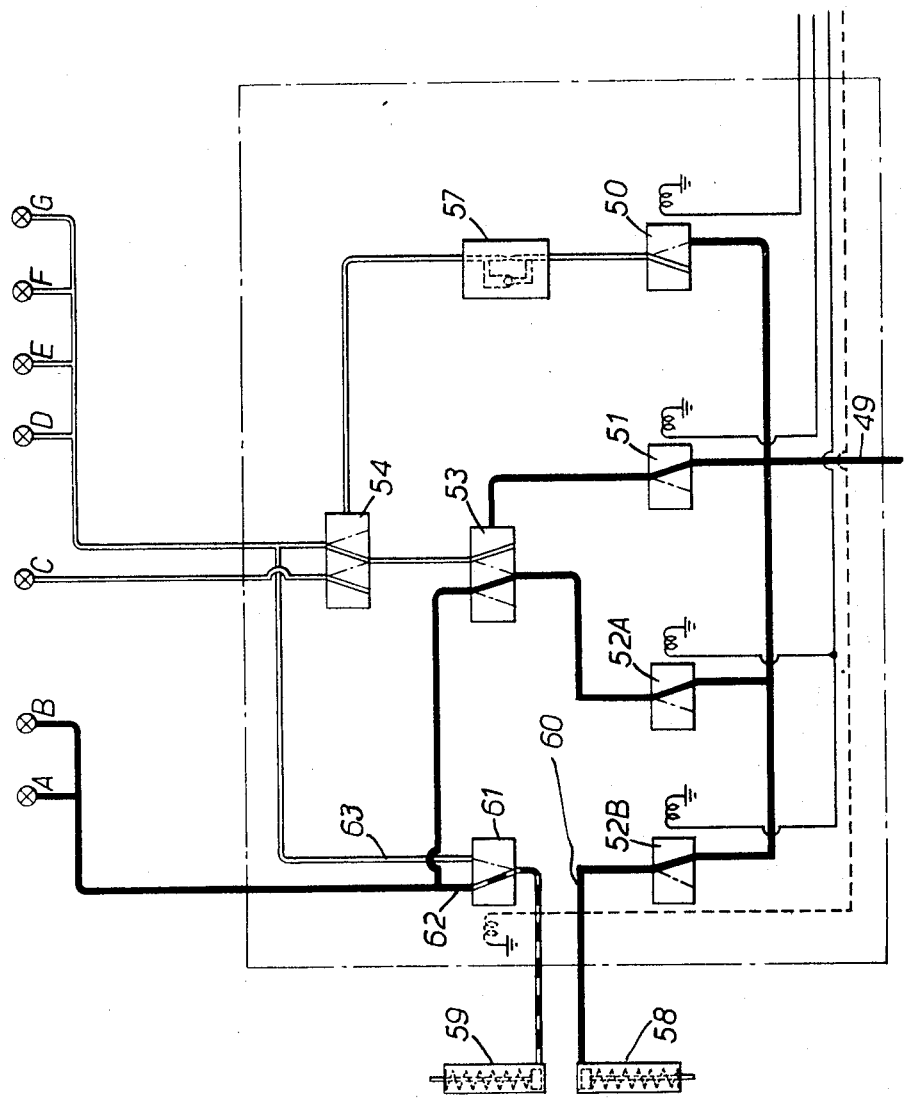
FIG. 2 is a circuit diagram of the control system for controlling the mode of operation of the engine, the control system being shown in the condition for normally aspirated running of the engine.
Figure 3:
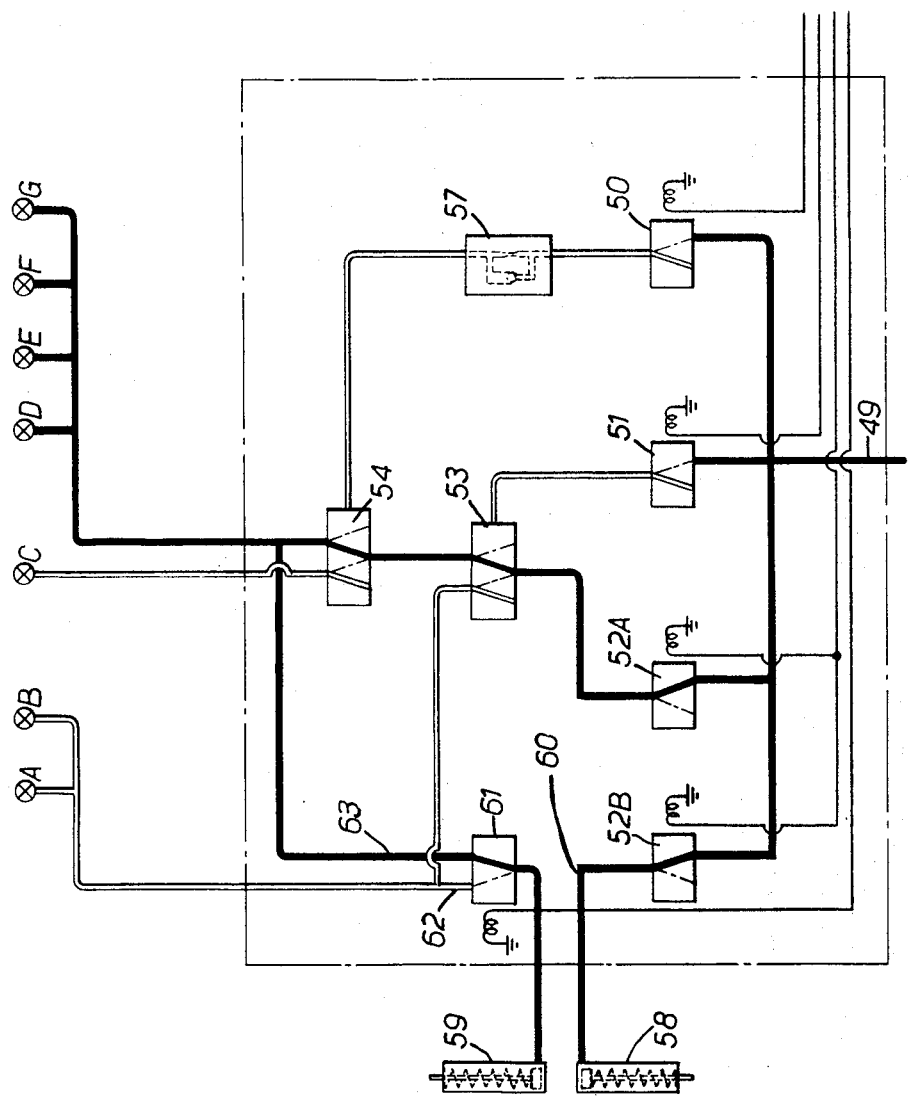
FIG. 3 is a view similar to FIG. 2 but showing the control system in the condition for operation in the recycling mode.
Figure 4:
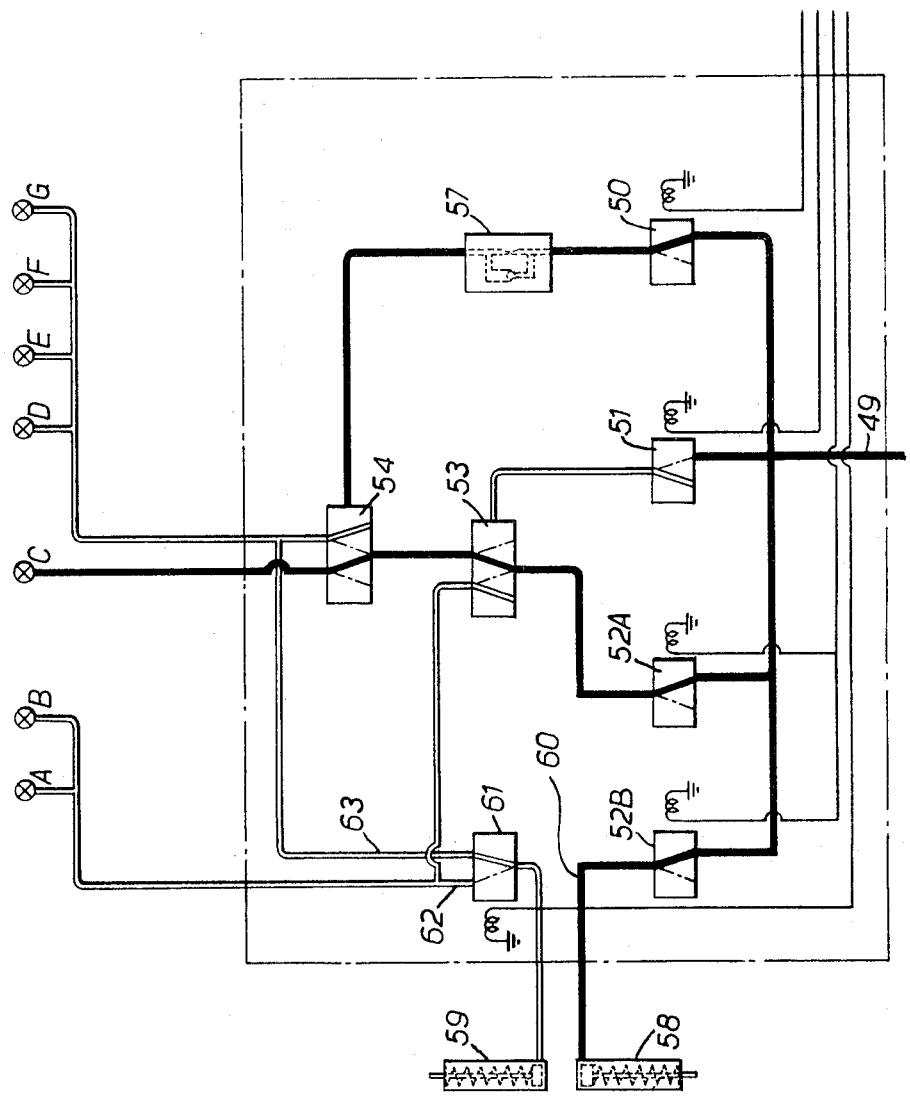
FIG. 4 is a view similar to FIGS. 2 and 3 but showing the control system in the condition for submerged starting.

The control system illustrated in FIGS. 2 to 4 comprises a logic system which includes three-way solenoid-operated pneumatic first-stage control valves 50, 51 and 52A and 52B and a pair of 4-way mono-stable pilot-operated pneumatic second-stage valves 53 and 54. The second-stage valves 53 and 54 control the admission of compressed air operating signals to the five basic groups of control valves, A, B, C, D-E, and F-G, which determine the mode of operation of the engine. All the valves A to G are biassed to their closed position by spring pressure and are opened pneumatically by compressed air signals from the control system. Each of the first-stage valves 50 to 52B has one outlet which can be connected by the movable valve member to either of two inlets. One inlet of each valve 50 to 52B is permanently connected to the main compressed air supply line 49 of the installation, and the other inlet is open to the atmosphere inside the hull or capsule 10A of the plant. The solenoids of the four valves 50 to 52B are energised from a 12 volt d.c. supply under the control of a control switch complex (not shown). The valves 50 to 52B are of the spring-returned type and each will return to its left-hand position shown in FIG. 2, in which its single outlet is vented back to atmosphere via the left-hand inlet, when the associated solenoid is de-energized.

Each of the pneumatically operated valves 53 and 54 has three inlets, one of which is connected in the system and the other two of which are open to the atmosphere in the hull or capsule 10A, and has two outlets one of which is connected to the first inlet and the other to one of the second inlets, depending upon the position of the movable valve member which is determined by the presence or absence of a pneumatic pilot signal applied to a control port of the valve to act on the movable valve member.

The first-stage valve 50 is controlled electrically by an engine start switch in the switch complex, and its pneumatic outlet is connected via a return-throttle valve 57 to the pilot or control port of the second-stage valve 54, to control that valve.

The first-stage valve 51 is controlled electrically by a surface/submerge switch (not shown), the valve 51 being energised when surface running is selected. This switch may take the form of a manual device, or it may be linked with the submarine or capsule control gear, but in either case it will be linked to an automatic depth sensor so that it cannot be accidentally switched to "Surface" when the craft or capsule is submerged. The first-stage valve 51 has its pneumatic outlet connected to the pilot or control port of the second-stage pneumatic valve 53 to control that valve.

The twin first-stage valves 52A and 52B are controlled electrically by a relay responsive to an engine turning signal, and will be energised all the time the engine 10 is turning. The valve 52A has its outlet connected to the first inlet of the second-stage valve 53, to supply air to that valve when the valve 52A is energised.

The two outlets of the second-stage valve 53 are connected respectively, one to the inlets of the exhaust compressor bypass valve A and the atmosphere intake valve B, and the other to the first inlet of the second-stage valve 54. The two outlets of the valve 54 are connected respectively, one to the starting air control valve C and the other to the recycle line isolator valve group D and E and to the oxygen supply valve group F, G.

The engine 10 is governed to run at a constant rated speed when recycling and at a constant rated speed or an idling speed on air aspiration. Two pneumatic cylinders 58 and 59 are provided for the control of the engine 10; one cylinder 58, the stop/start controller, acts on the stop control of the engine fuel pump. The other pneumatic cylinder 59, the rated speed/idle speed controller, acts on the fuel pump governor control. The cylinder 58 is energised via a branch pipe 60 from the outlet of the first-stage valve 52B, and the cylinder 59 is energized via a further solenoid-actuated pneumatic valve 61 electrically controlled by a switch in the switch complex. The valve 61 has two inlets, respectively connected by branch lines 62, 63 to the outlets of the second stage valves 53, 54 which lead to the valves A, B and to the valves D to G. When the valve 61 is energised by the closing of a switch, the pneumatic cylinder 59 is actuated.

The operation of the control system in controlling the various modes of operation of the engine 10 will now be described. Assume that the electric power is initially off and the control air supply to the line 49 is on. All the control system valves are in their spring-returned rest positions, and all air lines from these valves are exhausted. On a surface start, the turning of the engine by the starter closes the relay which energises the first-stage valve 52A to supply compressed air to the second-stage valve 53 and also energises the valve 52B to actuate the pneumatic cylinder 58 to the RUN position. The first-stage valve 51 is energised to supply a pilot signal to the control port of the second-stage valve 53 moving it to the position shown in FIG. 2. Thus compressed air is supplied via the valves 52A and 53 to the exhaust compressor bypass valve A to open the bypass, and also to the air intake valve B to open the latter, and to one of the inlet ports of valve 61. The first-stage valve 50 is also energised but as the second-stage valve 54 is isolated from the air supply by the position of the second-stage valve 53 no function is performed by the valve 50 in the surface start case. The control system remains in this condition throughout normal surface running with atmospheric air being aspirated through the open valve B, and the exhaust gas bypassing the compressor 17 via the open valve A and being discharged to atmosphere through the duct 38. In this condition either rated or idling speed can be selected by energising or de-energising valve 61 to activate or de-activate cylinder 59.

To change to recycle operation in preparation for submerging, the valve 51 is de-energised and returns to its rest position, exhausting the pilot signal to the second-stage valve 53, as shown in FIG. 3. This allows the second-stage valve 53 to return to its rest position also, switching off the compressed air supply to the valves A and B which thereupon exhaust through the valve 53 and are spring-closed. The air supply from the valve 54 is now delivered to the valves D to G, since the first-stage valves 52A and 52B remain energised by the engine turning signal. The engine will now operate under recycle conditions, with the atmospheric air intake valve B closed, and the exhaust compressor bypass valve also closed so that the excess exhaust gases not required for recycling are compressed to a sufficient pressure for discharge against the external water pressure. At the same time the recycle conduit isolator valves D and E are opened to allow the recycled exhaust gas to pass to the engine intake, mixed with pure oxygen supplied through the opened valves F and G. During recycle operation the engine is run at rated speed only, valve 61 being de-energized and electrically isolated.

Should the engine be stopped while running under recycle conditions, the circuit to the valves 52A and 52B will be broken by the opening of the associated relay, and the valves D to G will exhaust through the closed control system valves 54, 53 and 52A, thereby shutting off the oxygen supply and closing the recycling conduit 23a.

For a submerged start, the operation of the starter switch energises the first-stage valve 50, which supplies air via the pilot line and throttle valve 57 to the control port of the second-stage valve 54 which takes up the position shown in FIG. 4. As the engine turns, the associated relay closes to energise the first-stage valves 52A and 52B so that compressed air is supplied to the valve C via the control valves 52A, 53 and 54, and the control valve 52B is also energised to actuate the stop/start controller cylinder 58 to the run position. The opening of the valve C supplies compressed air from the bottle 22 for aspiration by the engine 10 during starting, when no recycle exhaust gas is available to dilute the pure oxygen. When the starter switch is released, the first-stage valve 50 returns to its rest position and the pilot line to the second-stage valve 54 is slowly exhausted. This timed exhausting of the control signal to the valve 54 is controlled by the throttle valve 57 which allows a free flow of air in the forward direction whilst providing a restriction to flow in the reverse or exhausting direction. When the pilot line is exhausted, the valve 54 returns to its rest position allowing the valve C to exhaust and shut off the compressed air supply, and simultaneously supplying air to the valves D to G to initiate the recycle aspiration conditions for continued running of the engine.

The return-throttle valve 57 thus controls the duration of the starting period during which the engine runs on compressed air, thus preventing excessive air consumption preceding a delayed switch-over to recycle running.

In the shut-down sequence, whether from normally aspirated running or recycle running, it is essential that the fuel pump stop control is returned to the stop position by the pneumatic cylinder 58 before the valves A and B, or D to G, close. This is achieved by the first-stage valve 52B which become de-energised to vent the cylinder 58. The valve 52B provides a single exhaust path for the cylinder 58, no other air lines using this exhaust path. The valves A and B for normal air aspiration, or D, E, F, and G for recycle operation, exhaust through the second-stage valve 53 on shut-down, and hence do not impede the exhausting of the pneumatic cylinder 58. If the valve 52B were not incorporated, the exhaust path through the valve 52A would be the only one available for these valves and the cylinder 58.

It will be appreciated that the control system is basically "fail-safe," since in the event of a loss of the electrical supply or of control air, the valves A to G will automatically be closed by their return springs.

Figure 5:
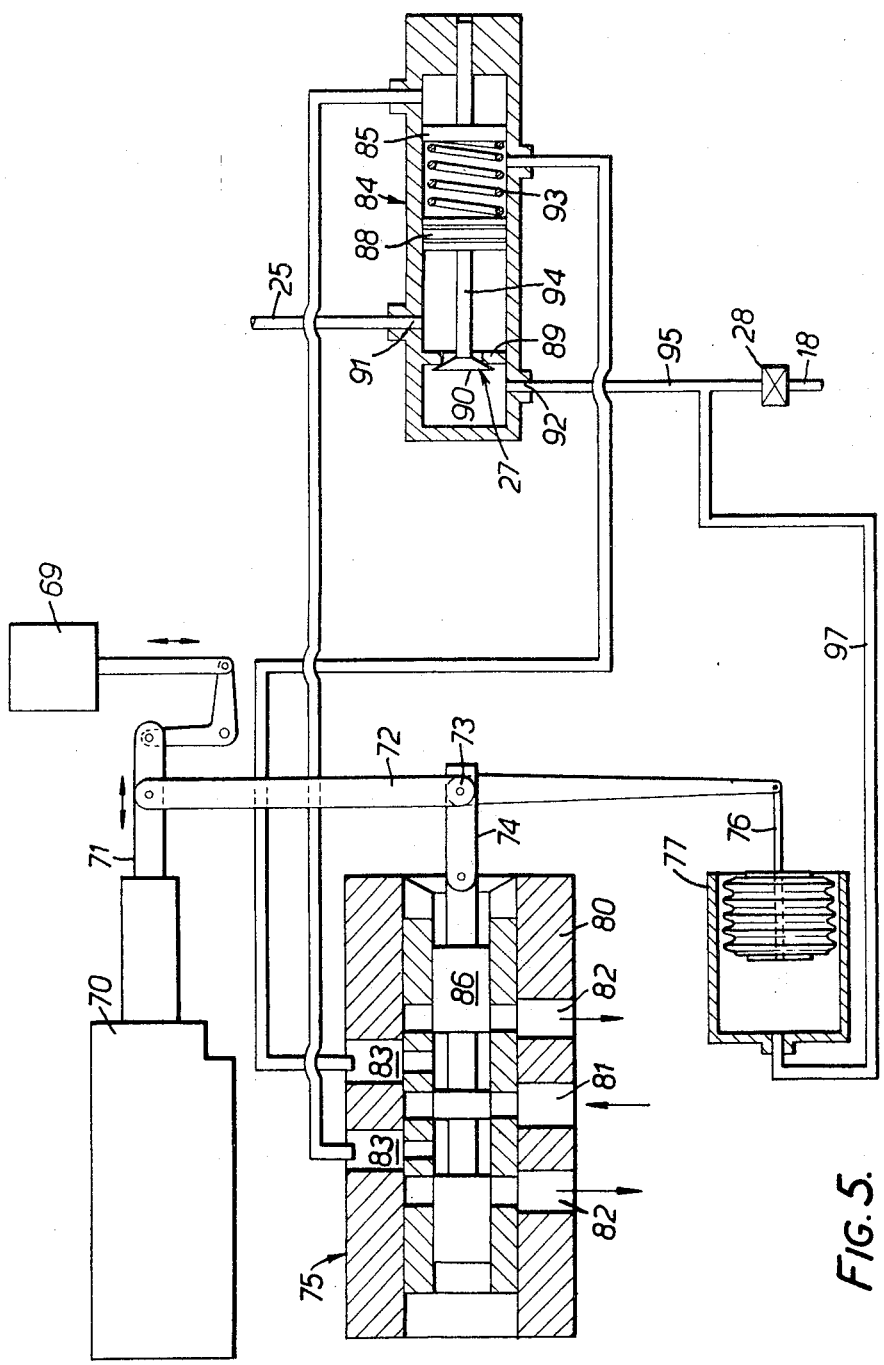
FIG. 5 is a diagram showing the means for regulating the proportion of oxygen to fuel introduced into the engine for combustion, under varying load conditions.

FIG. 5 shows the means for metering the relative proportions of oxygen and hydrocarbon fuel for combustion in the combustion chamber(s) of the engine 10 when operating in the recycle mode.

The engine 10 is provided with an in-line fuel injection pump 70 (not shown in FIG. 1) whose rack 71 is axially movable under the control of an engine governor 69 set to govern the engine to constant full speed, the rack position determining the fuel input. The rack 71 is connected to one end of a rigid lever 72 pivoted at an intermediate point 73 of its length to the valve spindle 74 of a hydraulic servo valve 75. The opposite end of the lever 72 is pivoted to the spindle 7 of a spring-loaded bellows capsule 77. The proportion of the lever-arms of the lever 72, and the spring rate of the bellows 77, are determined by the required oxygen flow characteristics.

The servo valve housing 80 has one inlet port 81 connected to the pressurised lubricating oil supply of the engine and two return ports 82 connected to the engine sump. It also has two control ports 83 connected to a double-acting hydraulic cylinder 84 respectively on opposite sides of a first piston 85 thereof. The ports 81, 82 and 83 cooperate with the valve spool 86 of the servo valve 75 so that movement of the spindle 74 in either direction moves the valve spool 86 out of its centralised position and admits pressurised oil from one or other of the control ports 83 into the hydraulic cylinder 84 on the corresponding side of the piston 85, which moves to expel oil from the cylinder 84 on the opposite side of the piston 85.

The hydraulic cylinder 84 also contains a second piston 88 which divides the interior of the cylinder into two compartments, one of which contains the oil and the first piston 85 and the other of which contains a fixed valve seating 89 and the movable valve member 90 of the reducing valve 27 for the oxygen flow. Pure oxygen gas at high pressure from the supply pipe 25 of FIG. 1 is admitted into the cylinder 84 via a port 91 on one side of the reducing valve 27 flows through the valve and is discharged through a port 92 on the other side of the reducing valve at a reduced pressure whose value depends on the setting of the valve spring 93 of the reducing valve. This valve spring 93 acts in compression between the piston 85 and the piston 88 in opposition to the high pressure of the oxygen acting on the opposite face of the piston 88. The piston 88 is connected to the movable valve member 90 by means of a spindle 94, so that the valve spring 93 tends to open the reducing valve in opposition to the high inlet pressure of the oxygen supply acting on the piston 88.

Thus movement of the piston 88 by oil admitted from the servo valve 75 will alter the compression of the valve spring 93 and will thus alter correspondingly the level of the reduced output pressure of the oxygen from the reducing valve 27.

The oxygen at reduced pressure from the output port 92 is passed via a pipe 95 to the critical flow orifice 28 of simple fixed-aperture design, from which it flows to the inlet manifold 18 for dilution with recycled exhaust gas and aspiration by the engine through the inlet 18. The oxygen flow rate to the engine depends on the pressure upstream of the orifice 28, which is determined by the instantaneous setting of the spring 93 of the reducing valve 27. A branch pipe 97 from the pipe 95 provides a feed-back signal of the oxygen pressure upstream of the orifice 28 to the interior of the bellows 77 to act on the lever 72 in opposition to the bellows spring.

The operation of this proportioning mechanism is as follows. At any fuelling level of the engine the spool 86 of the servo valve 75 is centrally positioned, and oil flow into and out of the hydraulic cylinder 84 is cut off. A change in engine load causes the fuel pump rack 71 to be moved by the engine governor 69 in the sense to restore the engine to its governed full speed by varying the fuelling accordingly, and this movement of the rack is transferred to the valve spool 86 by the lever 72, pivoting about its other end on the bellows spindle 76. Movement of the spool 86 causes oil to be admitted to the cylinder 84 on one side of the piston 85 and expelled on its other side, thus moving the piston 85 to alter the setting of the spring 93 of the reducing valve 27. This immediately alters the reduced output pressure of the oxygen downstream of the valve 27, which is also the gas pressure upstream of the metering orifice 28 and determines the flow rate of oxygen to the engine. The change in oxygen pressure upstream of the metering orifice 28 is sensed by the bellows 77, which at the appropriate pressure moves the lever 72 to restore the valve spool 86 to its centralised position. The oil supply to the cylinder 84 is thereby cut off to hold the valve spring 93 in its new setting, and the engine is stabilised at the new load condition.

The arrangement described is particularly advantageous in application to a recycling diesel engine, in that it acts to conserve the supply of oxygen rather than of fuel, which is easier to replace when consumed than is compressed oxygen, as well as preventing dangerous concentration of oxygen being admitted to the engine.

Figure 6:
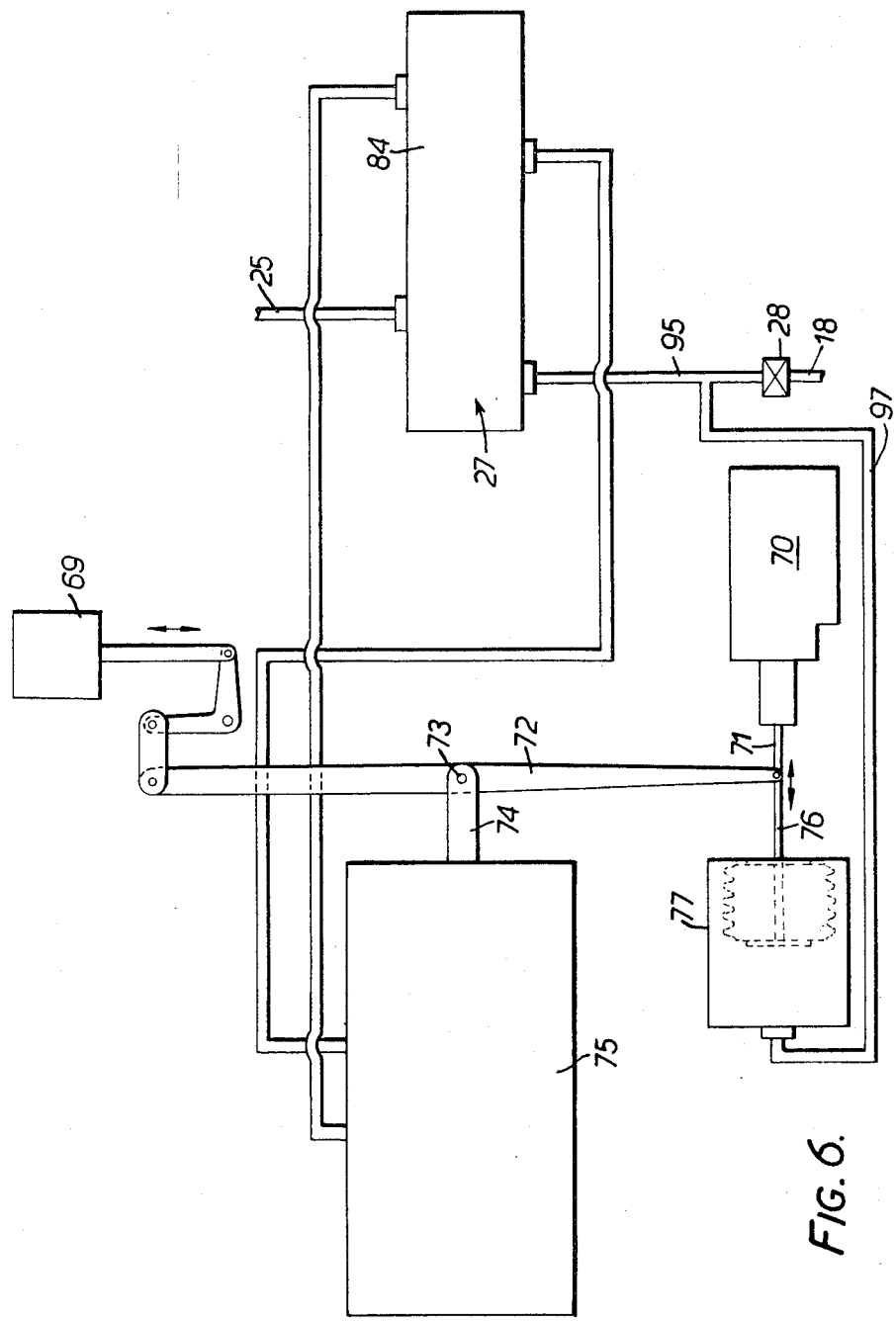
FIG. 6 is a view similar to FIG. 5 of a modified arrangement in which the fuel intake is controlled in dependence on the oxygen supply rate.

FIG. 6 shows a modification of the arrangement of FIG. 5, in which it is the oxygen gas pressure upstream of the metering orifice 28 which is adjusted in accordance with variations in engine speed under load for the purpose of regulating the engine to constant maximum speed, and this regulated upstream gas pressure is used to control the fuel intake in accordance with the desired proportioning. In this purpose the governor 69 is coupled to one free end of the lever 72, to adjust the servo 75 in response to a variation from the governed speed, this resulting in an adjustment of the reducing valve 27 in the hydraulic cylinder 84. The resultant change in gas pressure in the pipe 95 upstream of the orifice 28 is sensed by the aneroid capsule 77 which responds to move the lever 72 in the sense to reset the servo valve 75 to its centralised position. The movement of the spindle 76 of the aneroid capsule also acts on the rack 71 of the fuel injection pump 70 to adjust the fuel input in dependence on the change in gas pressure sensed by the aneroid capsule.

Figure 7:
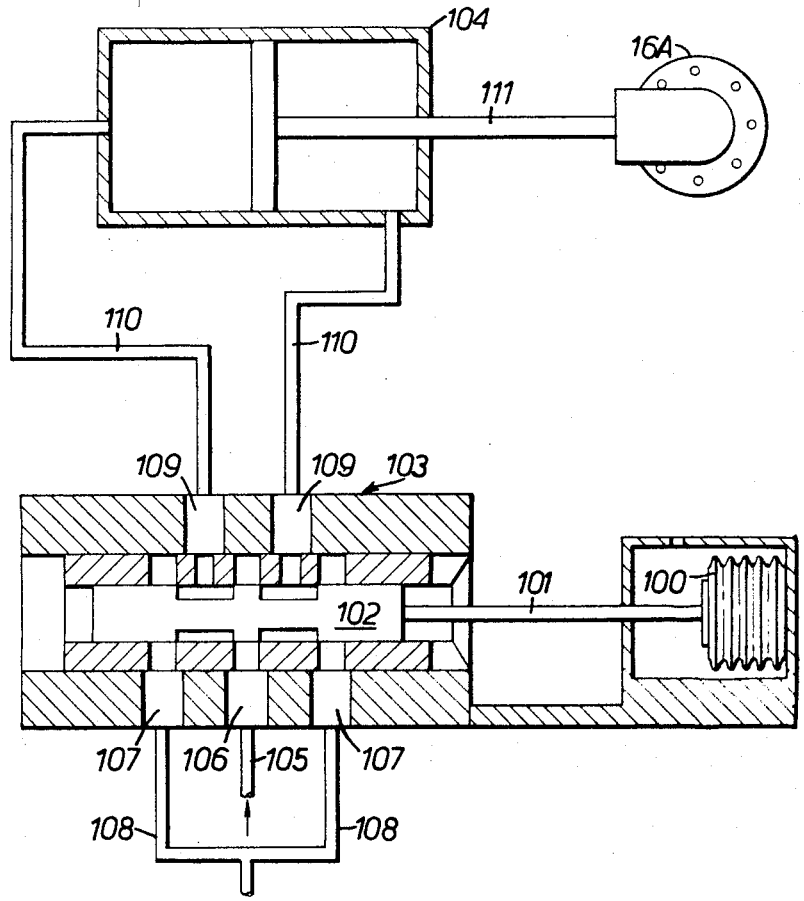
FIG. 7 is a diagram showing the means provided for regulating the gas pressure at the engine intake to a constant absolute value.

FIG. 7 illustrates the mechanism provided for regulating the gas pressure at the engine intake 18 to a constant absolute value, in order to obtain satisfactory operation of the engine 10 in the recycle mode.

An aneroid capsule 100 shown in FIG. 7 is mounted so as to sense the absolute gas pressure at the intake 18. The aneroid capsule 100 has an operating spindle 101 connected to its moving end wall, the spindle 101 being also connected to the valve spool 102 of a hydraulic servo valve 103. The servo valve 103 controls the admission of pressure oil from the engine lubricating system (not shown) into one end or the other of a hydraulic actuator cylinder 104. A pipe 105 connected to the engine lubrication system supplies pressure oil to an inlet port 106 of the servo valve 103, which also has two return ports 107 to which return pipes 108 leading back to the oil sump are connected. The servo valve 103 has delivery ports 109 connected by pipes 110 to opposite ends of the hydraulic actuator cylinder 104. Thus movement of the valve spool 102 of the servo valve 103 in either direction causes corresponding movement of the plunger rod 111 of the actuator cylinder 104. This plunger rod 111 is connected to the flow control valve 16A of the hydraulic motor 16 (see FIG. 1) by which the exhaust gas compressor 17 of the engine 10 is driven for recycling.

Thus any departure of the absolute gas pressure in the engine inlet manifold 18 from the required value will be sensed by the aneroid capsule 100, producing a movement of its spindle 101 which will move the servo valve 102 out of its centralised position and cause the actuator 104 to produce a corrective variation in the speed of the exhaust gas compressor 17. Since the speed of the exhaust gas compressor 17 determines the pressure at which exhaust gas is recycled through the recycling conduit 23a to the inlet manifold 18, the corrective variation of the speed of the compressor 17 will provide a corresponding correction of the inlet manifold pressure to its required absolute value, for example 20 p.s.i. absolute, which will cause the aneroid capsule 100 to restore the servo valve spool 102 to its centralised position, thus holding the flow control valve 16A of the hydraulic motor 16 in its correct setting. In this way the gas pressure in the inlet manifold 18 is regulated to a constant absolute value during recycling running of the engine 10 despite any variations in the ambient pressure in the hull or capsule in which the engine is operating.

What we claim as our invention and desire to secure by Letters Patent is:

1. An internal combustion engine power plant for operation in a submersible hull or capsule, including: an internal combustion engine of the liquid-fuel-injection kind having a gas intake and an exhaust, a supply of compressed air, a supply of pure oxygen gas, a variable-orifice pressure-reducing valve and a critical-flow metering orifice arranged in sequence between the oxygen supply and the engine intake, means for recycling a proportion of the exhaust gas discharged from the engine exhaust; means for supplying oxygen gas from the oxygen supply via the variable-orifice pressure-reducing valve and via the critical-flow metering orifice under "choked" flow conditions for aspiration mixed with the recycled exhaust gas at the engine intake and for combustion with fuel in the engine to operate the engine in the recycle mode, control valves by which the aspiration and exhaust of the engine are controlled, engine-speed-responsive governor means arranged to regulate the fuel input in such a way as to maintain constant engine speed under variable loads, and means for controlling the upstream gas pressure at the metering orifice by automatically adjusting the reducing valve in dependence on the fuel input to the engine.

2. A power plant as claimed in claim 1 having a fuel injection pump of the in-line type, the pump having a movable rack which comprises the fuel input control member, and an interconnection between the rack of the pump and the orifice-adjusting means of the reducing valve, the said connection comprising the means for controlling the upstream gas pressure in dependence on the fuel input.

3. An internal combustion engine power plant for operation in a submersible hull or capsule, including an internal combustion engine of the liquid-fuel-injection kind having a gas intake and an exhaust, a supply of compressed air, a supply of pure oxygen gas, a variable-orifice pressure-reducing valve and a critical-flow metering orifice arranged in sequence between the oxygen supply and the engine intake, means for recycling a proportion of the exhaust gas discharged from the engine exhaust, means for supplying oxygen gas from the oxygen supply via the variable-orifice pressure-reducing valve and via the critical flow metering orifice under "choked" flow conditions for aspiration mixed with the recycled exhaust gas at the engine intake and for combustion with fuel in the engine to operate the engine in the recycle mode, control valves by which the aspiration and exhaust of the engine are controlled, engine-speed-responsive governor means coupled to the reducing valve and arranged to adjust the gas pressure upstream of the metering orifice so as to regulate the oxygen input to the engine in such a way as to maintain constant engine speed under varying loads and means for controlling the fuel input to the engine automatically in dependence on the said upstream gas pressure.

4. A power plant as claimed in claim 3 having a fuel injection pump of the in-line type, the pump having a movable rack which comprises the fuel input control member, and actuating means responsive to the upstream gas pressure and connected to the rack of the pump, to control the fuel input to the engine in dependence upon the said gas pressure.

5. An internal combustion engine power plant for operation in a submersible hull or capsule, including an internal combustion engine of the liquid-fuel injection kind having a gas intake and an exhaust, a supply of compressed air, a supply of pure oxygen gas, and means for recycling a proportion of the exhaust gas discharged from the engine exhaust mixed with oxygen gas from the oxygen supply to the engine intake for combustion with fuel in the engine to operate the engine in the recycle mode, control valves by which the aspiration and exhaust of the engine are controlled, a variable-output exhaust gas compressor by which the recycled exhaust gas is supplied to the engine inlet at an inlet gas pressure determined by the volumetric output of the compressor, and means for controlling the volumetric output of the compressor in response to variations in the said inlet gas pressure, a variation of the inlet gas pressure from a predetermined absolute value causing a corresponding feedback signal to be applied to the said output control means of the compressor so as to restore the inlet gas pressure to said predetermined value.

6. A power plant as claimed in claim 5 which includes an aneroid capsule exposed to the gas pressure in the engine inlet and a connection between the aneroid capsule and the speed control means of the compressor to provide the said feedback signal.

7. A power plant as claimed in claim 6 including a hydraulic actuator mechanically coupled to the output control means of the exhaust gas compressor to control the compressor output, the hydraulic actuator being controlled by a hydraulic servo valve whose movable valve member is coupled to the movable member of the aneroid capsule.

8. A power plant as claimed in claim 5 in which the hydraulic actuator is energised via the servo valve by pressure oil derived from a pressurized lubricating system of the engine.

* * * * *